United States Patent
Fedigan et al.

(10) Patent No.: US 10,606,069 B2
(45) Date of Patent: Mar. 31, 2020

(54) ULTRASOUND LENS STRUCTURE CLEANER ARCHITECTURE AND METHOD

(71) Applicant: Texas Instruments Incorporated, Dallas, TX (US)

(72) Inventors: Stephen John Fedigan, Plano, TX (US); David Patrick Magee, Allen, TX (US); Yunhong Li, Santa Clara, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/225,212

(22) Filed: Aug. 1, 2016

(65) Prior Publication Data

US 2018/0031826 A1 Feb. 1, 2018

(51) Int. Cl.
G02B 27/00 (2006.01)
G02B 3/00 (2006.01)
B08B 7/02 (2006.01)

(52) U.S. Cl.
CPC ....... *G02B 27/0006* (2013.01); *G02B 3/0075* (2013.01); *B08B 7/028* (2013.01)

(58) Field of Classification Search
CPC .... G02B 27/0006; G02B 5/08; H04N 5/2171; B08B 7/02; B08B 15/04; B08B 7/028; B08B 17/02; B08B 7/0035; B08B 3/12
USPC ........................................................ 359/508
See application file for complete search history.

(56) References Cited

U.S. PATENT DOCUMENTS

| | | | |
|---|---|---|---|
| 3,520,724 A * | 7/1970 | Massa | B08B 3/12 134/1 |
| 3,643,135 A * | 2/1972 | Devore | H05K 1/144 361/730 |
| 3,681,626 A | 8/1972 | Puskas | |
| 4,019,073 A | 4/1977 | Vishnevsky et al. | |
| 4,271,371 A | 6/1981 | Furuichi et al. | |
| 4,510,411 A | 4/1985 | Hakamata et al. | |
| 4,607,652 A | 8/1986 | Yung | |
| 5,173,631 A | 12/1992 | Suganuma | |
| 6,078,438 A | 6/2000 | Shibata et al. | |
| 7,486,326 B2 | 2/2009 | Ito et al. | |
| 7,492,408 B2 | 2/2009 | Ito | |
| 7,705,517 B1 | 4/2010 | Koen et al. | |
| 8,293,026 B1 | 10/2012 | Bodor et al. | |
| 8,385,733 B2 | 2/2013 | Nomura | |

(Continued)

FOREIGN PATENT DOCUMENTS

| | | |
|---|---|---|
| CN | 104709241 A | 6/2015 |
| JP | 11260781 A | 9/1999 |

(Continued)

OTHER PUBLICATIONS

Graff, "Wave Motion in Elastic Solids", Dover, 1991, 3 pgs.

(Continued)

*Primary Examiner* — Jade R Chwasz
(74) *Attorney, Agent, or Firm* — Michael A. Davis, Jr.; Charles A. Brill; Frank D. Cimino

(57) ABSTRACT

A lens structure system. The system comprises a lens structure and a multi-segmented transducer coupled to the lens structure. The multi-segmented transducer comprises a plurality of segments. For each segment in the plurality of segments, there also is a first conductor and a second conductor electrically coupled to the segment.

23 Claims, 10 Drawing Sheets

(56) References Cited

U.S. PATENT DOCUMENTS

| | | | |
|---|---|---|---|
| 9,228,183 B2 | 1/2016 | Lipkens et al. | |
| 2003/0214588 A1 | 11/2003 | Takizawa et al. | |
| 2004/0134514 A1 | 7/2004 | Wu et al. | |
| 2005/0280712 A1* | 12/2005 | Kawai | H04N 5/217 348/207.99 |
| 2008/0166113 A1 | 7/2008 | Yasuda et al. | |
| 2008/0247059 A1 | 10/2008 | Dong | |
| 2009/0011243 A1 | 1/2009 | Yamada et al. | |
| 2010/0158501 A1 | 6/2010 | Kawai | |
| 2010/0165187 A1 | 7/2010 | Miyazawa | |
| 2010/0171872 A1 | 7/2010 | Okano | |
| 2011/0228389 A1 | 9/2011 | Ohashi | |
| 2012/0243093 A1* | 9/2012 | Tonar | H01L 41/0973 359/507 |
| 2017/0048061 A1 | 2/2017 | Bohdan et al. | |

FOREIGN PATENT DOCUMENTS

| | | |
|---|---|---|
| JP | 2007193126 A1 | 8/2007 |
| JP | 2010181584 A | 8/2010 |
| RU | 2393644 C1 | 6/2010 |

OTHER PUBLICATIONS

Hagedorn et al., "Travelling Wave Ultrasonic Motors, Part I: Working Principle and Mathematical Modelling of the Stator", Journal of Sound and Vibration, 1992, 155(1), pp. 31-46.

Li, et al., "Ultrasound Lens Structure Cleaner Architecture and Method Using Standing and Traveling Waves," U.S. Appl. No. 15/395,665, filed Dec. 30, 2016 (55 pages).

Li, et al., "Ultrasonic Lens Cleaning with Travelling Wave Excitation," U.S. Appl. No. 15/186,944, filed Jun. 20, 2016 (31 pages).

International Search Report for PCT/US2017/038348 dated Sep. 7, 2017.

English language translation of Abstract from JP 0011260781A dated Sep. 24, 1999, cited by International Search Report for PCT/US2017/038348; 2 pages.

International Search Report for PCT/US2017/044807 dated Nov. 2, 2017.

European Search Report for EU Application 17837503.6 dated Jul. 18, 2019.

* cited by examiner

ULTRASOUND LENS STRUCTURE CLEANER ARCHITECTURE AND METHOD

CROSS-REFERENCES TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The preferred embodiments relate to various systems where debris or contaminants are to be removed from lens-related apparatus in the system, and more particularly to an ultrasound architecture and method in such a system.

A lens structure as used in this document is intended to include a lens, lens cover, or other surface through which a signal (e.g., light) may pass, and where the apparatus is exposed to potential contaminants that may reduce the likelihood of successful signal passage through the apparatus. As one prominent example, in the automotive industry, cameras are assuming an important role in both Driver-Assisted Systems (DAS) and automatic safety systems. This technology commonly first appeared in relatively expensive vehicles and has migrated to less expensive ones. Indeed, the National Highway Traffic Safety Administration (NHTSA) has mandated that all new cars must be outfitted with rear view cameras by 2018. Cameras are also now being incorporated into side view mirrors to assist drivers with lane changes and currently under consideration by at least one automobile manufacturer is the possible replacement of vehicle side view mirrors with side view cameras. Besides alleviating blind spots for the driver, front cameras integrated into the windshield provide Forward Collision Warning (FCW), Following Distance Indication (FDI), and Lane Departure Warnings (LDW).

In the above context and others, and as the trend toward additional lens structure increases or becomes more ubiquitous, keeping the lens structure (e.g., lenses and lens covers) free of contaminants becomes a more prevalent need and is particularly important in safety-related applications. As one prior art approach to this issue, several manufacturers have considered a miniature spray and wiper system. This design, however, requires (1) a small pump and nozzle; (2) a motorized wiper assembly; and (3) running a hose from a fluid tank to the location of the nozzle, which may necessitate a run from the vehicle front where a fluid tank is typically located, to the vehicle back, at least for the rear view camera, which is typically located at the rear of the vehicle. As a result, this design is mechanically complex and potentially expensive.

Given the preceding, the present inventors seek to improve upon the prior art, as further detailed below.

BRIEF SUMMARY OF THE INVENTION

In a preferred embodiment, there is a lens structure system. The system comprises a lens structure and a multi-segmented transducer coupled to the lens structure. The multi-segmented transducer comprises a plurality of segments. For each segment in the plurality of segments, there also is a first conductor and a second conductor electrically coupled to the segment.

Numerous other inventive aspects are also disclosed and claimed.

DETAILED DESCRIPTION OF EMBODIMENTS

Figure 1A:
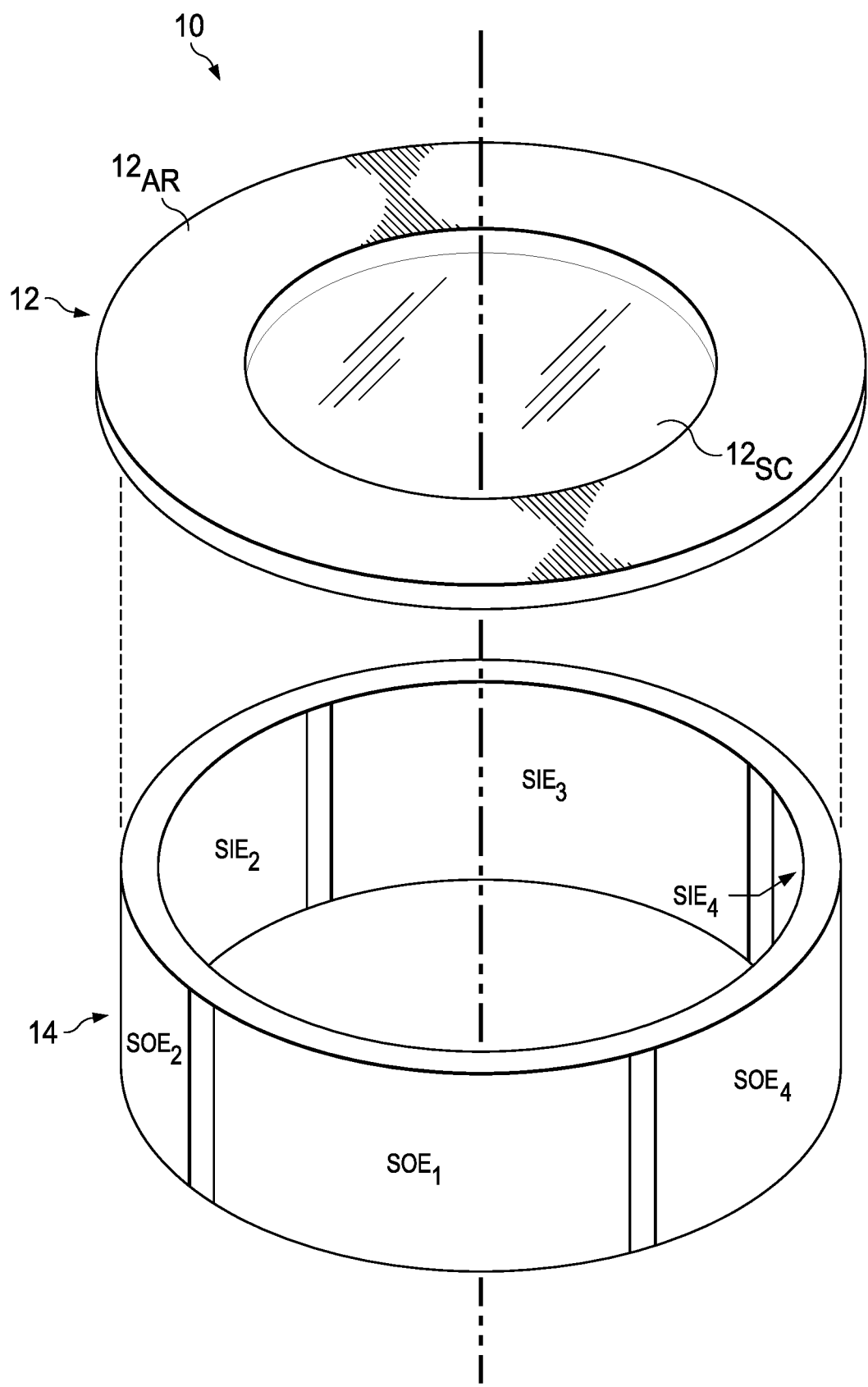
FIG. 1A illustrates preferred embodiment system in a perspective exploded view.
Figure 1B:
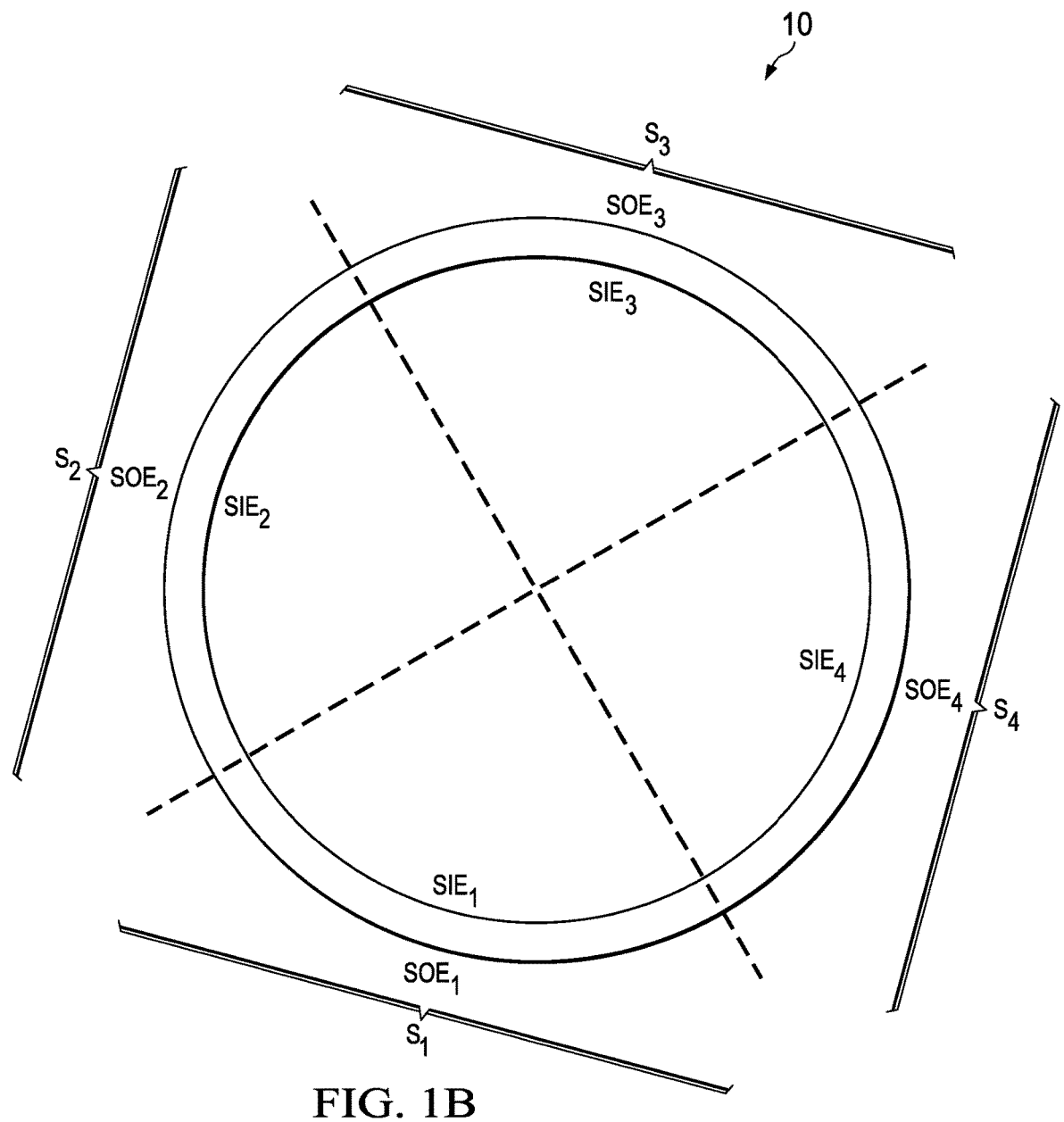
FIG. 1B illustrates a top view of the ultrasonic transducer of FIG. 1A.
Figure 1C:
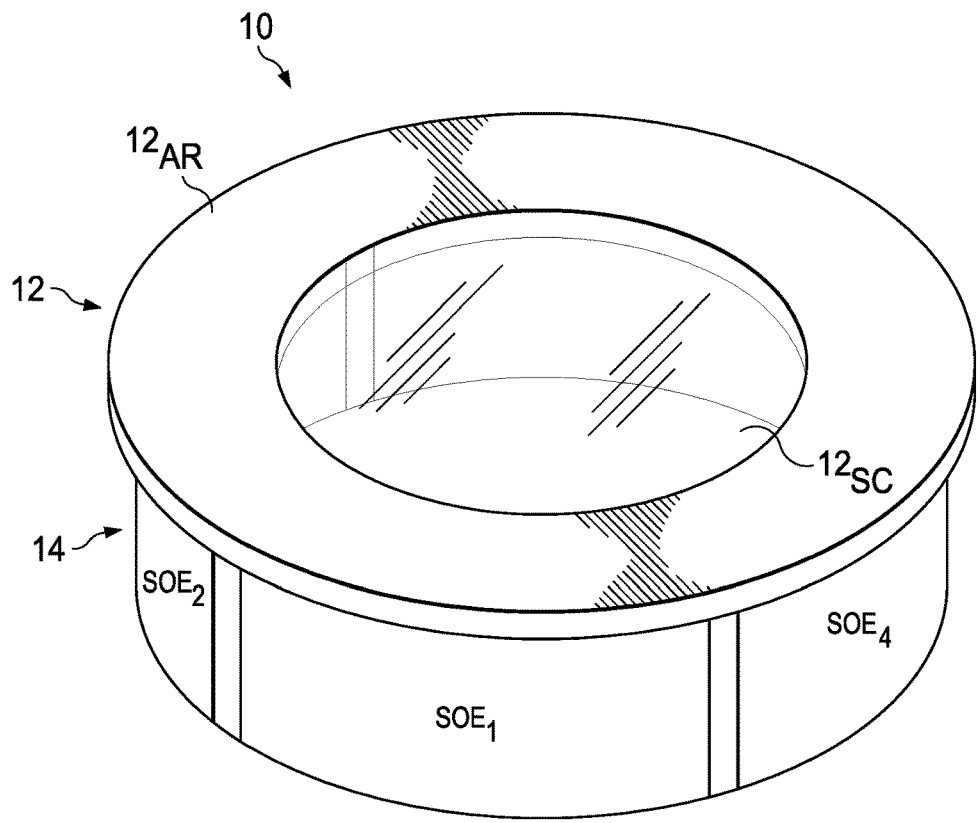
FIG. 1C illustrates the lens cover affixed atop the upper annular surface of an ultrasonic transducer.

FIG. 1A through 1C illustrate various views of a lens structure cleaning system 10 according to a preferred embodiment. For example, FIG. 1A illustrates system 10 in a perspective exploded view, thereby separately illustrating a lens cover 12 that is to be coupled to of an ultrasonic transducer 14, that is, affixed in some manner (e.g., atop an upper annular surface, directly, or indirectly through an additional member(s)) of ultrasonic transducer 14 so that vibrations from ultrasonic transducer 14 may be transmitted either directly, or indirectly via any intermediate apparatus, to lens cover 12. FIG. 1B illustrates a top view of just ultrasonic transducer 14, and FIG. 1C illustrates lens cover 12 once affixed atop the upper annular surface of an ultrasonic transducer 14, as may be achieved via various adhesives that may be selected by one skilled in the art. Various aspects of system 10 are further described below, with reference to all three of these figures.

Lens cover 12 is intended to represent any type of lens structure as was introduced in the Background of The Invention section of this document. In the example of system 10, lens cover 12 is a disc with a transparent center section $12_{SC}$ (shown with a contrasting shading for distinction to the remainder) and an outer annular ring $12_{AR}$ that surrounds transparent center section $12_{SC}$. Thus, in general light in the visible spectrum may readily pass through transparent center section $12_{SC}$, while it is otherwise blocked by outer annular ring $12_{AR}$. In this manner, and while not shown, a camera, and its respective lens, may be placed proximate lens cover 12, whereby generally light may pass through transparent center section $12_{SC}$ so as to reach the camera lens, but the lens is otherwise protected by the additional surface provided by lens cover 12. In many environments, transparent center section $12_{SC}$ may become occluded by the presence of additional contaminating matter (e.g., dirt, water, other airborne constituents) so that light is partially or fully blocked from passing through that section, and the preferred embodiments endeavor to reduce or dispel such matter from the surface of lens cover 12.

Figure 6:
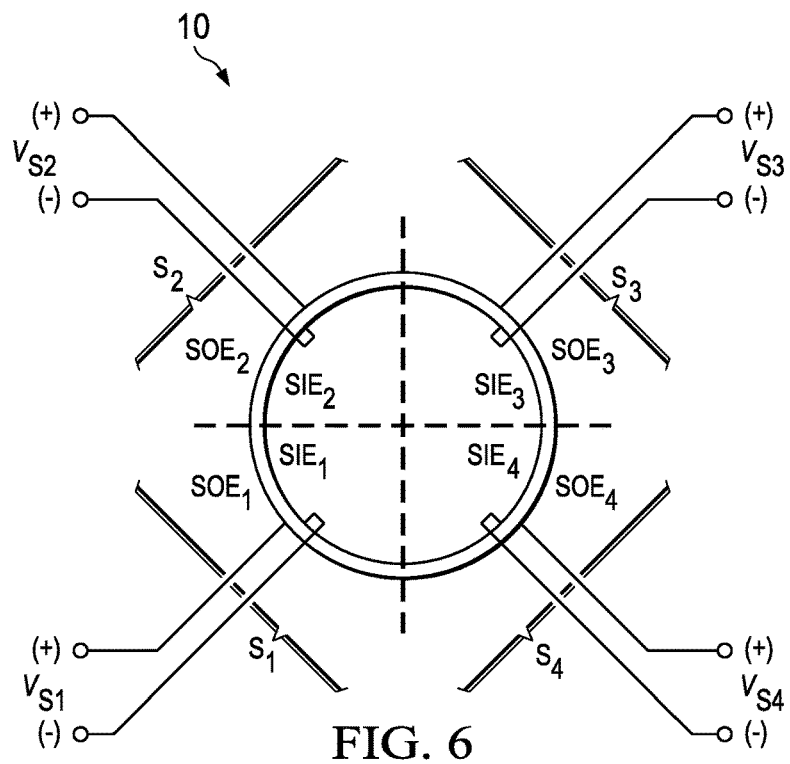
FIG. 6 illustrates a preferred embodiment transducer and biasing conductors connected thereto.

Transducer 14, in a preferred embodiment, is formed from a cross-section of a cylindrical piezoelectric material, and it preferably has an outer diameter smaller than the outer diameter of lens cover 12. By way of example, therefore, the outer diameter of transducer 14 may be 10 to 30 mm, while the larger outer diameter of lens cover 12 may be 12 to 35 mm. Thus, once assembled (e.g., FIG. 1C), the outer perimeter of lens cover 12 extends in some margin beyond the outer diameter of transducer 14. As appreciated below, such a configuration may improve the effectiveness of standing waves transmitted from transducer 14 to lens cover 12, thereby improving the ability to dispel contaminants from the surface of that lens cover. Transducer 14 is a segmented transducer, as defined by having plural circular sectors, each having a pair of conductors so as to apply a voltage to the sector. In the example illustrated, transducer 14 has four such segments (or sectors), shown in FIG. 1B as $S_1$, $S_2$, $S_3$, and $S_4$, each consisting of approximately 90 degrees of the entire 360 degree circular cross-sectional perimeter of the transducer. Each segment $S_x$ has an outer electrode $SOE_x$ and an inner electrode $SIE_x$, as may be achieved by silk-screening or otherwise attaching a thin conductive material to the respective outer and inner diameter of the piezoelectric material. As shown in a later FIG. 6, electrical connectors/wires may be connected to each of the illustrated electrodes, thereby permitting signals to be applied, and alternated in amplitude, sign, and frequency, so as to achieve various preferred embodiment aspects further described below.

Given the preferred embodiment apparatus described above, transducer 14 may be excited with various signals so as to communicate vibrational forces into the abutted lens cover 12. Such waves may be communicated in three different vibration modes, namely, radial mode at low frequencies (e.g., 44 kHz) and which are along the radii of the circular cross section of transducer 14, axial mode at relative middle frequencies (e.g., 250 kHz), which are in the direction of the axis of the cylindrical transducer (i.e., vertical in FIGS. 1A-1C), and a wall mode at higher frequencies (e.g., 2 MHz), which are modes that represent the radial motion of the wall thickness with respect to the outer wall of transducer 14. In a preferred embodiment, axial mode vibrations are preferred, as they are likely to cause vibrations that are tangential from the surface of lens cover 12, thereby providing a greater likelihood of dislodging certain contaminants (e.g., dust, water) from that surface. Note that frequency ranges of the various mode types may overlap. For example, high order radial modal frequencies will overlap with the axial modal frequencies, and high order axial modal frequencies will overlap with wall modal frequencies. However, in practice, this is not normally an issue because as mode orders increase, so does the modal damping.

Further to the preceding, also in the preferred embodiment, the vibrational forces are applied at excitation amplitudes and frequencies so as to transmit standing waves into the desirably chosen circular membrane shape of the abutted lens cover 12. As is known in certain areas of physics, a standing wave is a stationary vibrational pattern created within a medium when two waves of the same frequency propagate through the medium in opposite directions. As a result, regions of minimum displacement (e.g., nodes) and regions of maximum displacement (e.g., anti-nodes) are created at fixed locations in the medium. As a result, the waves cause displacement along the medium (i.e., lens cover 12 in this instance), yet at the physical locations where wave interference occurs, there is little or no movement. Hence, in a circular membrane as exists in the preferred embodiment, where standing waves are so transmitted, the art defines certain mode shapes of the vibrational tendencies and movements of the surface being vibrated. Each mode shape is identified in the art by a convention of mode (d,c) shape, where d is the number of nodal diameters across the membrane surface, and c is the number of nodal circles at or within the perimeter of the circular membrane, where the term nodal (or node) refers to a point, line, or circle on the structure that has zero amplitude vibration, that is, it does not move, while the rest of the structure is vibrating. Various examples of mode shapes, by way of introduction and also in connection with preferred embodiments, are further explored below.

Figure 2A:
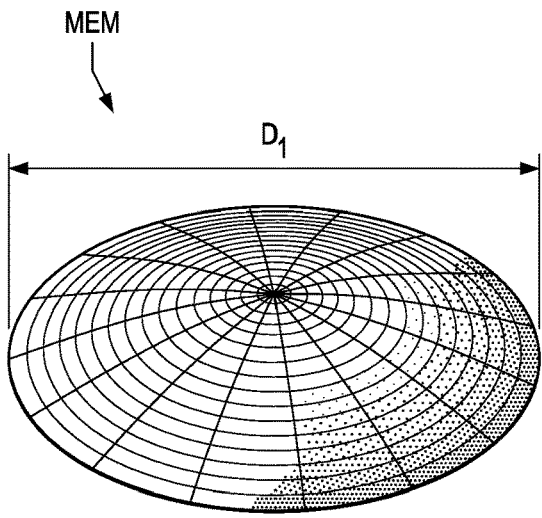
FIGS. 2A and 3A illustrate perspective views.
Figure 2B:
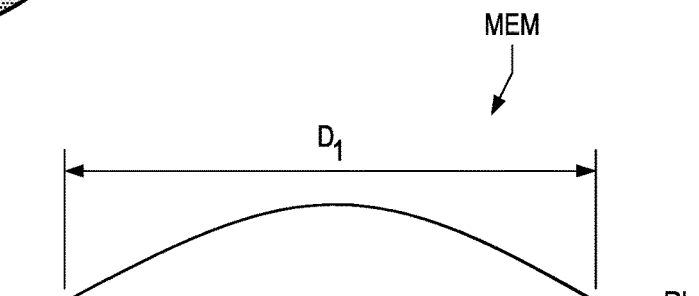
FIGS. 2B and 3B illustrate side views, of a membrane MEM and its mode shape diagrams of a first mode (0,1) shape.
Figure 3A:
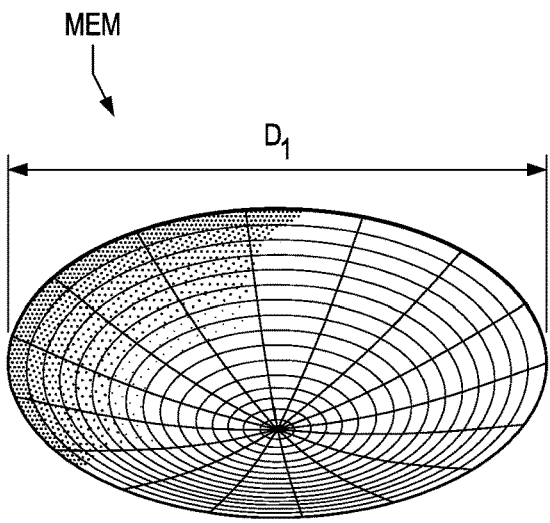
Figure 3B:
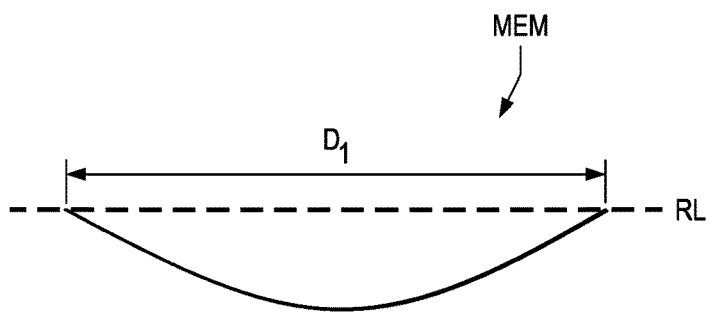

To further introduce mode shapes and various preferred embodiment aspects, FIGS. 2A and 3A illustrate perspective views, and FIGS. 2B and 3B illustrate side views, of a membrane MEM and its mode shape diagrams of a first mode (0,1) shape that may be achieved by applying a voltage to the multiple-segmented transducer 14 of the preferred embodiment as if it were a single segmented transducer; such an effect may be achieved, therefore, by applying a first sine wave potential to all of its outer electrodes and a second sine wave potential, 180 degrees offset from the first sine wave (also achievable by a cosine counterpart to the sine), to all of its inner electrodes, where both sine waves have a same first modal frequency. Alternatively, the effect may be achieved by applying a sine wave potential to all of the outer electrodes while connecting the inner electrodes to ground (or, vice versa, that is, grounding the outer electrodes and connecting the same sine wave to all inner electrodes). A modal frequency is one of the resonant frequencies for the system under consideration (i.e., here, lens cover 12), where the particular resonant frequency, among multiple resonant frequencies of the system, causes the shape of the respective mode. In this regard, FIGS. 2A, 2B, 3A, and 3B, therefore, represent an instance where transducer 14 receives a voltage and first modal frequency, $f_{m(0,1)}$, which creates mode (0,1) shape, also known as a "cupping" mode, as further detailed below.

The depictions of FIGS. 2A and 3A are generally representative of a perspective circular shape as shown by concentric circles between a center point and the outer perimeter. Radial lines are also shown, and if the shape were flat such lines would be straight. A curved radial line, however, suggests movement along the line. In this regard, therefore, FIG. 2A is intended to illustrate a first extreme of the oscillatory movement of member MEM, where the surface bends upward (e.g., for reference, in a positive direction) with a peak elevation at the center of the shape (also shown by light gray shading). The upward bend is also appreciated in the counterpart side view of FIG. 2B, which shows the mode surface as contrasted to a horizontal, or flat, reference line RL that is shown by a dashed line. In opposite fashion, FIG. 3A is intended to illustrate a second extreme of the oscillatory movement of member MEM, where the surface bends downward (e.g., for reference, in a negative direction) also with a peak elevation at the center of the shape (also shown by dark gray shading). The downward bend is also appreciated in the counterpart side view of FIG. 3B.

Given the illustrations of FIGS. 2A, 2B, 3A, and 3B, note that the reference of a mode (0,1) indicates zero (i.e., d=0) nodal diameters and a single (i.e., c=1) nodal circle, the latter shown as $D_1$. Note that the location of the nodal circle will depend on the conditions at the boundary of the membrane, where the illustrations assume that boundary is claimed; however, if the boundary were not claimed, the radial location of the nodal circle will change. In other words, as member MEM oscillates between the extreme positions shown in the Figures, a single circle, around the outside perimeter, does not vibrate. The vibrations inside nodal circle with diameter $D_1$, therefore, will have some efficacy in removing contaminants that are on the surface of member MEM, but any matter that lands at (or near) the nodal circle with diameter $D_1$ may not experience sufficiently high acceleration to be removed. Further, material in high vibration zones may be pushed into these nodal circles. Still further, and as appreciate later, a singular mode (0,1) has a limited area on membrane MEM that may reach a desirable amount of axial acceleration, thereby limiting the ability of the membrane to dispel contaminants.

Figure 4A:
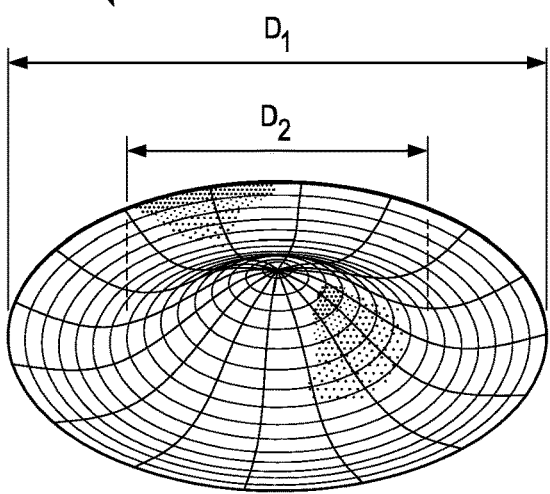
FIGS. 4A and 5A illustrate perspective views.
Figure 4B:
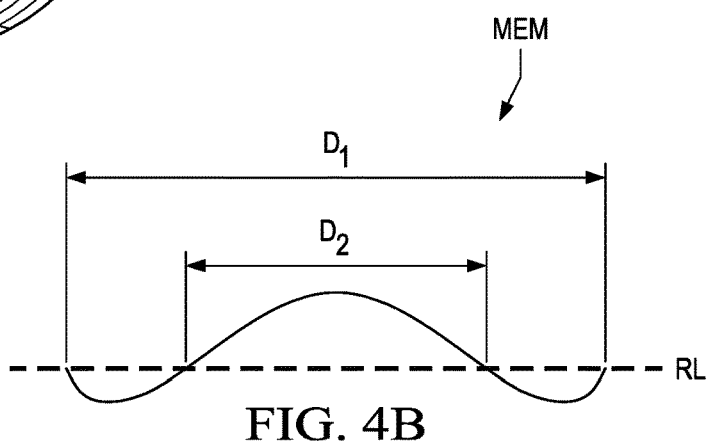
FIGS. 4B and 5B illustrate side views, of a membrane MEM and its mode shape diagrams of a second mode (0,2) shape.
Figure 5A:
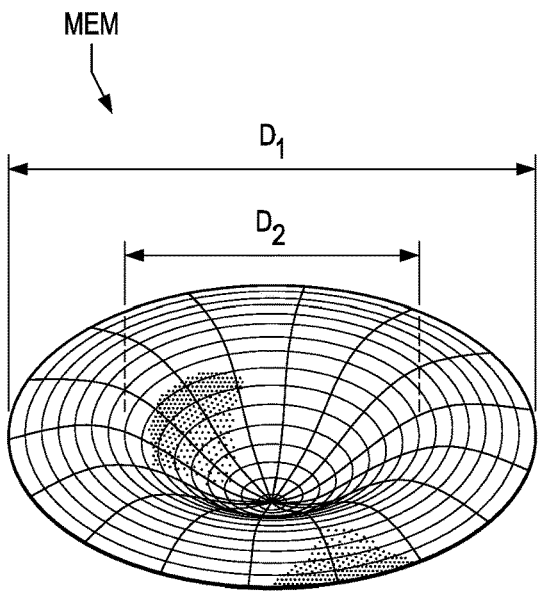
Figure 5B:
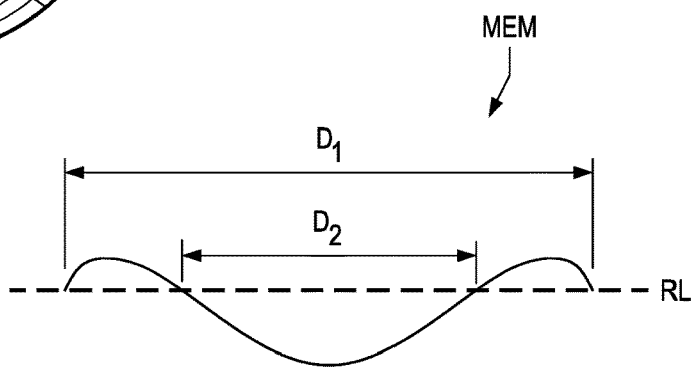

By way of an additional example, FIGS. 4A and 5A illustrate perspective views, and FIGS. 4B and 5B illustrate side views, of a membrane MEM and its mode shape diagrams of a second mode (0,2) shape that may be achieved by applying a voltage to the multiple-segmented transducer 14 of the preferred embodiment again as if it were a single segmented transducer, by again applying respective 180 degree out-of-phase sine waves to all of its outer electrodes and to all of its inner electrodes, but here at a second modal frequency, $f_{m(0,2)}$, which creates mode (0,2) shape, as further detailed below.

The depictions of FIGS. 4A and 5A are again representative of a perspective circular shape as shown by concentric circles and radial lines, where FIG. 4A is intended to illustrate a first extreme of the oscillation, and FIG. 5A is intended to illustrate a second and opposite extreme of the oscillation. In the first extreme shown in FIG. 4A, and in the counterpart horizontal plot of FIG. 4B, membrane MEM has a peak positive amplitude extending upward at the center of the shape, while at the same time membrane MEM also extends downward below the reference line RL, beyond the radii that is larger than a nodal circle with diameter $D_2$. In opposite fashion, in the second extreme shown in FIGS. 5A and 5B, membrane MEM has a peak negative amplitude extending downward at the center of the shape, while at the same time membrane MEM also extends upward above the reference line RL, beyond the radii that is larger than the nodal circle with diameter $D_2$. Thus, as indicated by the (0,2) reference, the mode shape of these Figures has (i.e., d=0) nodal diameters and two (i.e., c=2) nodal circles, one nodal circle at the outer perimeter shown with diameter $D_1$, and the other nodal circle as described above with diameter $D_2$, where the surface of membrane MEM having a diameter less than $D_2$ bend in a first direction, while the surface of membrane MEM having a diameter greater than $D_2$ bend in a second direction, opposite the first direction. Such an approach also will have some efficacy in removing contaminants that are on the surface of member MEM, but contaminants may tend to remain at both nodal circles with diameters $D_1$ and $D_2$ and a singular application of the mode (0,2) shape will have limited acceleration across much of the area of membrane MEM.

It is therefore recognized in connection with the above that certain modes achievable by transducer 14, if operated by applying voltages to multiple segments at the same time so as to function as a single segmented transducer, results in axle symmetric mode shapes. For example the (0,1) shape has a single outer nodal circle with diameter $D_1$ at its perimeter, and inside that perimeter the flexing is circularly symmetric as shown by the comparable concentric circles with radii inside that outer nodal circle. As another example, the (0,2) shape also has an outer nodal circle at its perimeter, within which the flexing of the membrane is again along equally flexing radii, but where the flexing can be in opposite directions, relative to an inner concentric nodal circle with diameter $D_2$. Such symmetry in the flexing, however, may be less likely to expel certain contaminants from lens cover 12, or it may tend to accumulate contaminants in nodal points or circles. The preferred embodiments include additional modes of operation, therefore, so as to achieve improved results over these considerations, as further explored below.

FIG. 6 again illustrates transducer 12 in the same general manner as depicted in FIG. 1B, although in FIG. 6 the illustration is rotated for sake of reference, and conductors are shown connected to pairs of respective segment outer electrodes $SOE_x$ and inner electrodes $SIE_x$. Moreover, a potential is defined between each paired set of conductors. For example, the voltage between outer electrode $SOE_1$ and inner electrode $SIE_1$ is defined as $V_{S1}$, and note the (+) and (−) conventions are used to define a polarity for sake of reference, but as detailed below not to suggest that the outer electrode is always positive with respect to its inner counterpart. To further illustrate this convention, therefore, a voltage of +1V applied to $v_{S1}$ is intended to suggest that the one volt is positive to outer electrode $SOE_1$ relative to inner electrode $SIE_1$, while a voltage of −1V applied to $v_{S1}$ is intended to suggest that the one volt is negative to outer electrode $SOE_1$ relative to inner electrode $SIE_1$.

Figure 7A:
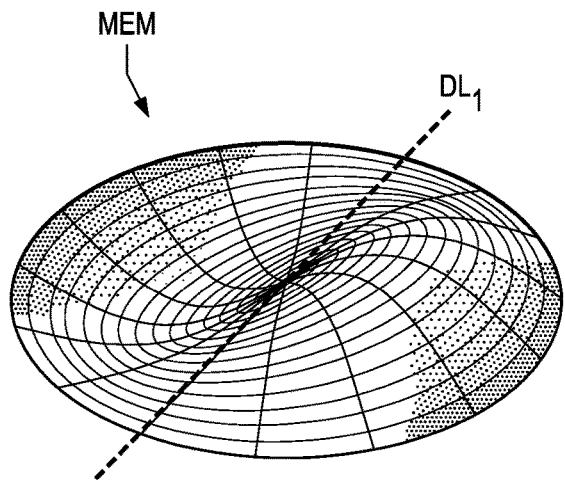
FIGS. 7A and 7B illustrate a first oscillatory cycle in perspective and horizontal views of a mode (1,1) shape.
Figure 7B:
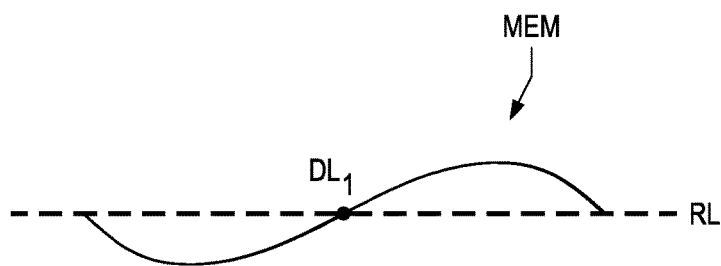
Figure 8A:
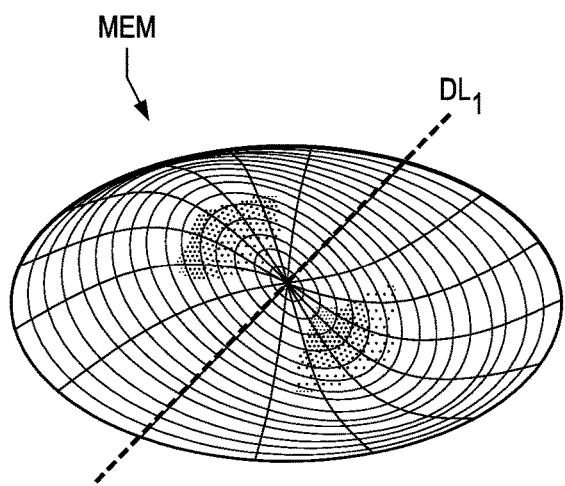
FIGS. 8A and 8B illustrate a second oscillatory cycle in perspective and horizontal views of a mode (1,1) shape.
Figure 8B:
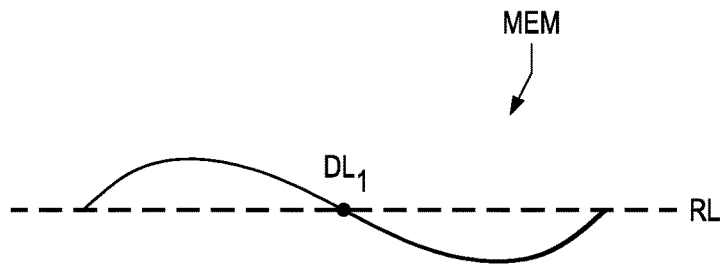
Figure 9:
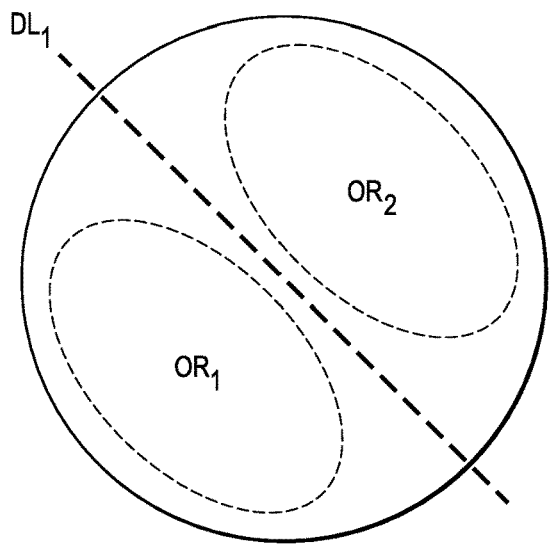
FIG. 9 illustrates a top view of the two separate oscillating regions $OR_1$ and $OR_2$, about line $DL_1$, as achieved in FIGS. 7A and 7B.

Given the preceding, while all sets of conductors of transducer 12 may receive a voltage at a single time, for example, as described earlier, in a preferred embodiment a conductor subset also may be receive a voltage. In this regard, for example, a sine wave at a modal resonant frequency $f_{m(1,1)}$ may be applied to one pair of conductors/electrodes, with a 180 degree opposite phase sine wave at the same resonant frequency $f_{m(1,1)}$ applied to an opposing pair of conductors/electrodes. Thus, in a preferred embodiment, a first phase of the sine wave is applied to $v_{S1}$, while a second phase of the sine wave, 180 degrees apart from the first phase, is applied to $v_{S3}$; at the same time, no voltage is applied to $v_{S2}$ or $v_{S4}$. With this voltage application, a mode (1,1) shape is achieved, as is shown in a first oscillatory cycle in perspective and horizontal views in FIGS. 7A and 7B, and in a second oscillatory cycle in perspective and horizontal views in FIGS. 8A and 8B. As can be seen in these Figures, in mode (1,1) shape, membrane MEM again has a nodal circle around its outer perimeter. In addition, however, one diameter line $DL_1$ represents a nodal line, as oscillations occur left and right of that line, due to the voltage applied to of opposing pairs of conductors/electrodes as introduced just above (e.g., to $v_{S1}$ and $v_{S3}$). Thus, to further illustrate additional aspects below, the alternative oscillations about diameter line $DL_1$ also may be represented in a top view, as is shown in FIG. 9, which generally illustrates the two separate oscillating regions $OR_1$ and $OR_2$, about line $DL_1$.

Figure 10:
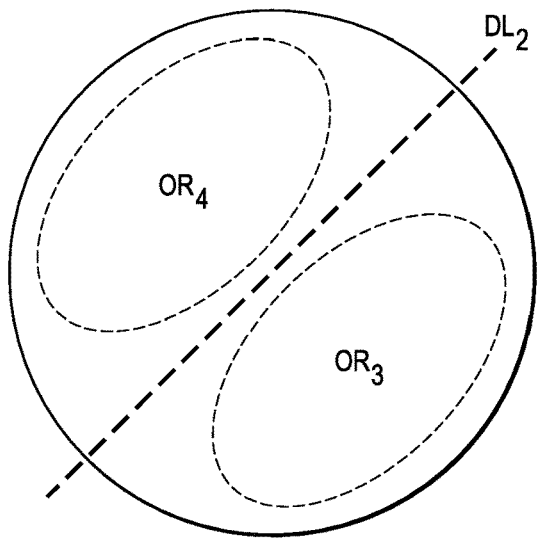
FIG. 10 illustrates a top view of two separate oscillating regions $OR_3$ and $OR_4$, about a line $DL_2$, as achieved 90 degrees rotated and with alternative biasing relative to FIGS. 7A and 7B.

It is recognized in connection with the preferred embodiments that the mode (1,1) shape described above does not include symmetric nodal circles as did the mode (0,2) described above, and thus, vibrating lens cover 12, via transducer 14, to implement the mode (1,1) shape has advantages in that there is not an inner ring as represented by the inner nodal circle with diameter $D_2$ described earlier. Hence, expelling contaminants may be achieved in a fashion that is more likely to avoid circular residue. In a further aspect of the preferred embodiment, however, instead of only applying voltage to conductor/electrode pairs with signals $v_{S1}$ and $v_{S3}$ at a frequency $f_{m(1,1)}$ and with a sine wave 180 degrees out of phase with respect to the two signals, at an alternative time the same sine wave/off phase voltage at a frequency $f_{m(1,1)}$ is applied to conductor/electrode pairs with signals $v_{S2}$ and $V_{S4}$, while at the same time no voltage is applied to $v_{S1}$ or $v_{S3}$. Such an approach yields the result illustrated in FIG. 10, where again a mode (1,1) shape is achieved with the two separate oscillating regions $OR_3$ and $OR_4$, about a single nodal line $DL_2$, but note that the nodal line and oscillating regions are rotated 90 degrees relative to FIG. 9. In this regard, therefore, the vibration and acceleration forces imposed on lens cover 12 in FIG. 9 (at regions $OR_1$ and $OR_2$) are in different locations (i.e., 90 degrees offset) than at regions $OR_3$ and $OR_4$ in FIG. 10. In a preferred embodiment, therefore, a switching driver architecture is implemented to switch between these two (or other) alternatives, so as to avail of the advantages of more than one vibrational mode, as further explored below.

Figure 11:
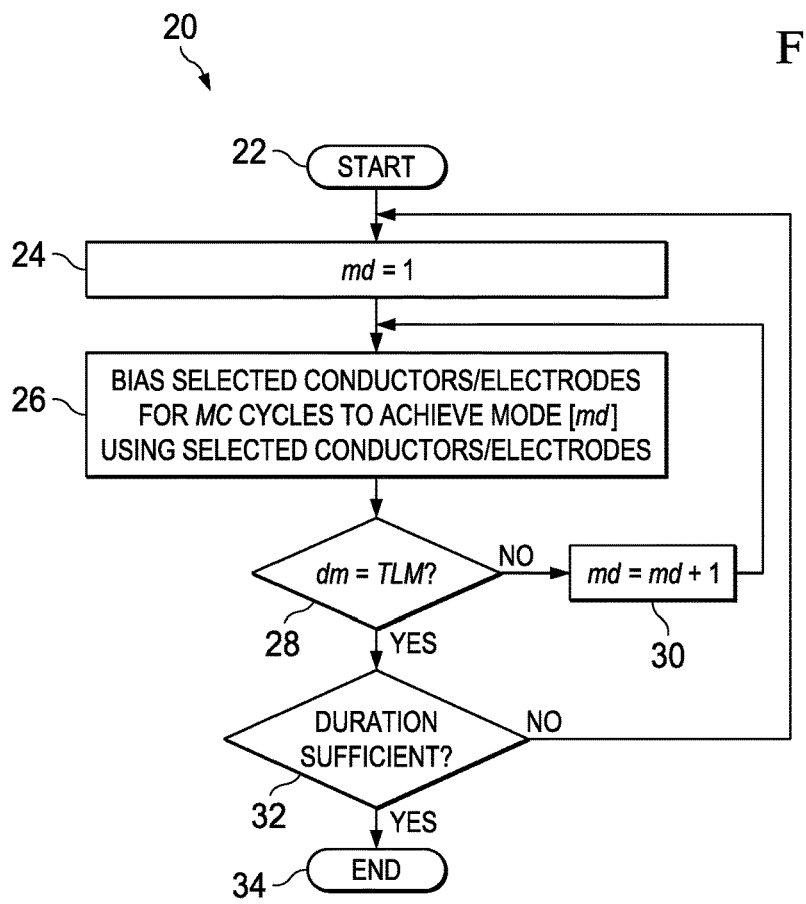
FIG. 11 illustrates a preferred embodiment method of operating the system of FIG. 1.

FIG. 11 illustrates a preferred embodiment method 20 of operating system 10. By way of introduction, method 20 may be controlled by a processor, controller, or other circuit or device, as may be hardwired or programmed by concepts according to one skilled in the art. As further introduction, such control advances method 20 so as to apply transducer voltages to selective ones (or all) of the conductors/electrodes of system 10, so as to alternate between different mode shapes created in lens cover 12, via standing waves applied to it from transducer 14. In combination, therefore, the standing waves increase the ability to accelerate the surface of lens cover 12 so as to achieve a desirably sufficient amount of acceleration coverage across a majority of the area of the cover. As a result, the accelerated movement of the lens cover increases the chances of dispelling portions of any contaminants along a majority of the area of the cover. Additional details follow.

Method 20 commences with a start step 22, which may be initiated by various apparatus or events, when it is desired to start an attempt to remove particulate from lens cover 12 by vibrating it via transducer 14. For example, where lens cover 12 is part of an automotive application as was introduced earlier and further explored later, start step 22 may be user actuated, such as by an operator of the automobile, or a processor can initiate the step in response to a condition, such as at system start-up, or after the passage of time, or response from a sensor or upon detection of some other event, such as rain, that might cause some matter (e.g., water) to come in contact with the exterior of lens cover 12. In any event, once step 22 is enabled, method 20 has begun, after which method 20 continues from step 22 to step 24.

In step 24, a mode counter and is initialized to a value of one. As will become evident below, mode counter and increments, and thereby provides a count, up to a total number of modes TLM that are shaped onto lens cover 12, by transducer 14, in cyclic and alternating fashion, so as to attempt to remove contaminants from lens cover 12. Next, method 20 continues from step 24 to step 26.

In step 26, voltage is applied to a set of selective ones or all of the electrodes of transducer 14, via the respective conductors connected to those electrodes, so as to achieve a mode, indicated as MODE[md], meaning according to the index provided by counter md. Thus, for a first occurrence of step 26, then a first mode (i.e., MODE[1]) is effected by applying the necessary voltage signals to a first set of electrodes so as to accomplish that mode. For example, consider the first mode to be the application of the mode (0,1) shape, discussed earlier in connection with FIGS. 2A, 3A, 2B, and 3B. To achieve this mode, all outer electrodes $SOE_x$ receive a voltage of a first sine wave, while all inner electrodes $SIE_x$ receive a voltage of a second sine wave of the same sample amplitude as the first sine wave, but with the two waves phase offset by 180 degrees; moreover, both sine waves are applied with a frequency $f_{m(0,1)}$, which is the resonant frequency of system 10 required to achieve the mode (0,1) shape. Lastly, note that step 26 applies the signals to the selected set of conductor/electrodes for a number indicated as MC cycles, that is, for a duration of input sign waves equal to MC periods or cycles. Note that the value of MC may be selected by various considerations. For example, MC may be based on a pre-programmed value or on a feedback signal (e.g., modal resonance frequency which will return to a baseline value as contaminant mass is ejected from the surface), or from information from a camera system from which it can be determined if a sufficiently clear image is obtained through the lens. After the MC cycles at the current MODE[md] have been achieved, method 20 continues from step 26 to step 28.

In step 28, a condition is evaluated to determine whether the mode counter and has reached a total number of modes TLM that are desired to be shaped onto lens cover 12, by transducer 14. If and is less than TLM, then method 20 advances from step 28 to step 30, whereas if and equals TLM, then method 20 advances from step 28 to step 32. In step 30, the mode counter and is incremented and the flow returns to step 26. In a repeat of step 26, therefore, an additional set of selective ones or all of the electrodes of transducer 14 receive a voltage so as to achieve a next mode, indicated as MODE[md], which in the case of a first repetition of step 26 will be the second mode, that is, MODE[2]. For example, consider the second mode to be the application of the mode (1,1) shape, discussed earlier in connection with FIGS. 7A, 8A, 7B, 8B, and 9. To achieve this mode, recall that a first phase of the sine wave is applied to $v_{S1}$, while a second phase, 180 degrees apart from the first phase, of the sine wave is applied to $v_{S3}$, while at the same time no voltage is applied to $v_{S2}$ or $v_{S4}$, and both sine waves are applied with a frequency $f_{m(1,1)}$. Again, step 26 applies these signals to the selected set of conductor/electrodes for MC cycles, after which method 20 again continues from step 26 to step 28.

Step 28 has been described earlier, as it evaluates the condition of whether the mode counter and has reached a total number of modes TLM that are desired to be shaped onto lens cover 12, by transducer 14. Given the sequencing now described, and the potential looping from step 28 not being satisfied and returning to step 26 one or more times for the application of respective additional modes, note that TLM may be set to any number with a corresponding indication of each MODE[md] to be applied for each incidence of step 26. Continuing with the previous example, after a first occurrence of step 26 applies the mode (0,1) shape and a second occurrence of step 26 applies the mode (1,1) shape per FIG. 9 (i.e., applying $v_{S1}$ and the 180 degree apart $v_{S3}$,), with TLM set to three a third occurrence of step 26 may be reached to apply the mode (1,1) shape per FIG. 10 (i.e., applying $v_{S2}$ and the 180 degree apart $v_{S4}$). In this case, after the third occurrence, the condition of step 28 is satisfied and method 20 continues to step 32.

In step 32, a condition is evaluated to determine whether a sufficient duration of cycles has been applied by the preceding occurrence(s) of step 26. To appreciate this step, recall that each incidence of step 26 excites transducer 14 to apply a standing wave mode shape to lens cover 12, for a total of MC cycles per step 26 incidence. Each of these MC cycles, therefore, endeavors to clear contaminants from the surface of lens cover 12. Depending on the number of cycles per step 26 incidence, and the number of step 26 occurrences, it may be desirable to repeat the occurrence(s) of step 26 for all TLM modes MODE[md] one or more additional times, in an ongoing effort to clear contaminants from the surface of lens cover 12. Thus, the step 32 condition may use duration (or some other measure) as a basis to evaluate whether to repeat the occurrence(s) of step 26 for all modes MODE[md]. If such a repetition is desired, method 20 returns from step 32 to step 24, whereas if step 32 is satisfied, then method 20 ends in step 34. While method 20, therefore, concludes with step 34, it may be subsequently re-started by returning to step 22, by one of the actions as mentioned earlier with respect to that step.

Given the preceding, one skilled in the art will appreciate that with TLM=3 and the modes described, that method 20 applies a sequence of three different modes, each for MC cycles, so as to vibrate lens cover 12 in differing fashions. Further in this regard, acceleration from modal vibration may be represented by the following Equation 1:

$$a_{(d,c)}(r,\theta) = \omega_{(d,c)}^2 z_{(d,c)}(r,\theta)$$ Equation 1 where, $a_{(d,c)}$ is acceleration for a mode (d,c);

$\omega_{(d,c)}$ is resonance frequency for a mode (d,c); and $z_{(d,c)}(r,\theta)$ is the mode shape for mode (d,c) which is a function of the radius r from the center and the angle θ about the circumference with respect to a reference angle (i.e., vertical displacement in a polar coordinate system).

Figure 12:
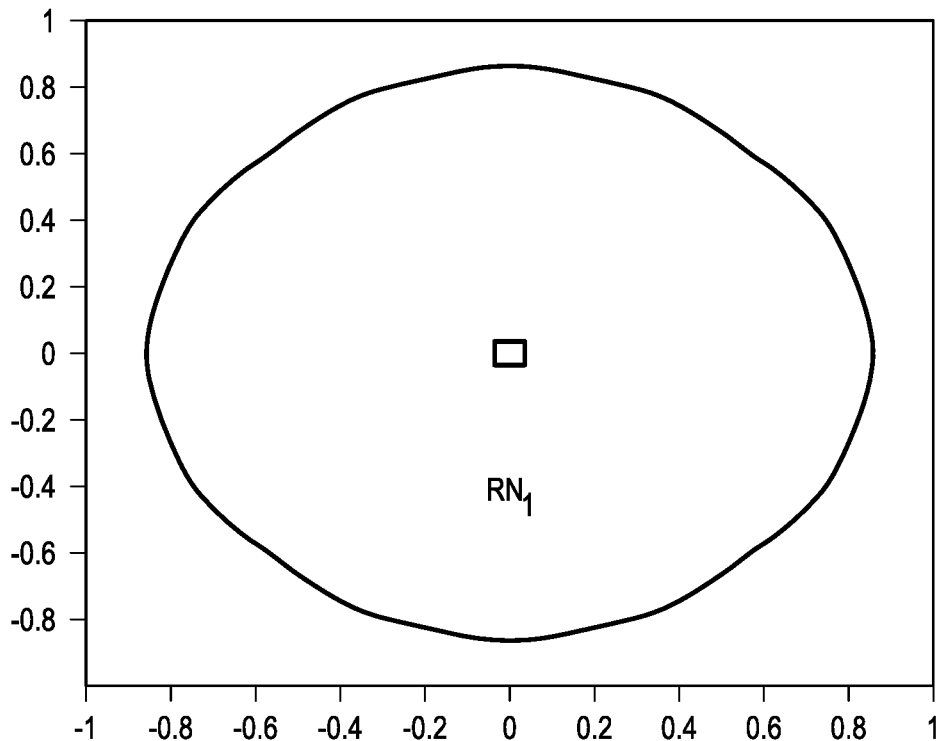
FIG. 12 illustrates a coverage map of a preferred embodiment lens cover for three separate mode shapes: (0,1), followed by (1,1) relative to a first nodal line (e.g., FIG. 9), followed by mode (1,1) relative to a second nodal line (e.g., FIG. 10).
Figure 13:
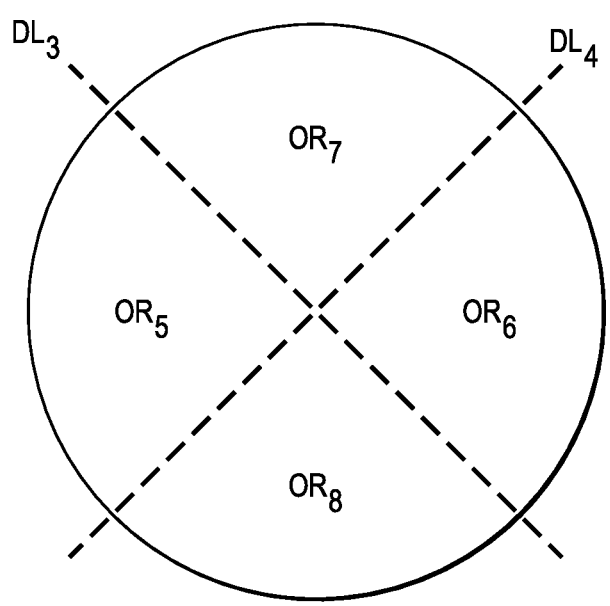
FIG. 13 illustrates a top view representation of a mode (2,1) shape.
Figure 14:
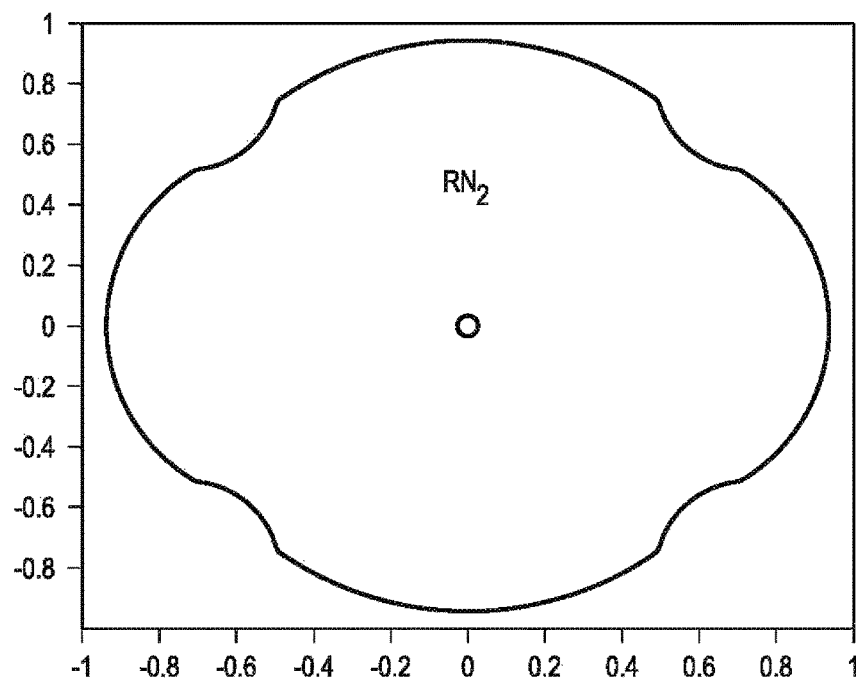
FIG. 14 illustrates a coverage map of a preferred embodiment lens cover for the mode shapes of FIG. 12, followed by an additional mode (2,1) shape.

From Equation 1, therefore, acceleration is a function, in part, of the frequency squared. Moreover, in each of the multiple different modes, one area of lens cover 12 will achieve a maximum or peak acceleration, while various other areas of the lens cover will achieve some lesser percentage of that peak. In an effort to achieve the greatest likelihood of dispelling contaminants, therefore, a greater percentage of peak acceleration across a greater area of lens cover 12 is likely to be desirable. In this regard, FIG. 12 illustrates a coverage map of lens cover 12 where a region $RN_1$ represents the area where acceleration of the lens cover surface reaches at least 75% of its peak value. Region $RN_1$ corresponds to the example provided above, where TLM=3 and the three separate mode shapes applied (by respective incidences of step 26) are mode (0,1), followed by mode (1,1) relative to a first nodal line (e.g., FIG. 9), followed by mode (1,1) relative to a second nodal line (e.g., FIG. 10), where the second nodal line is orthogonal to the first nodal line. Visually, therefore, FIG. 12 represents a considerable amount of coverage area where acceleration of at least 75% of peak may be sufficient to dislodge or expel surface contaminants Indeed, it is expected in connection with this preferred embodiment that 60% of the entire area of the lens cover 12 should reach at least 75% of peak acceleration. Further to the above, alternative preferred embodiment results may be achieved by altering the number of and/or types of modes applied. Indeed, as more modes are included in an application of method 20, and for a given acceleration threshold (e.g., 75% of acceleration peak for the above example), as more modes are added, the area coverage monotonically increases. As a further illustration in this regard, therefore, transducer 12 may receive voltage to achieve a mode (2,1) shape, which FIG. 13 illustrates in a top view representation. The mode (2,1) shape has two nodal lines $DL_3$ and $DL_4$ and a single outer perimeter nodal circle. With the two nodal lines $DL_3$ and $DL_4$, four separate oscillating regions $OR_5$, $OR_6$, $OR_7$ and $OR_8$, occur, and these regions therefore may be added to the regions covered by the above-described modes, for example, by increasing TLM to four and adding the FIG. 13 mode as yet another mode in method 20. In this regard, FIG. 14 illustrates a coverage map of lens cover 12 with a region $RN_2$, again representing the area where acceleration of the lens cover surface reaches at least 75% of its peak value, where mode (2,1) has been added as a fourth step 26 vibrational pattern, that is, over and above the above example illustrated by acceleration area coverage in FIG. 12. By comparing FIG. 14 to FIG. 12, one skilled in the art will confirm that the areal coverage is increased with additional mode (2,1). In addition, note further that the central area where peak acceleration is not achieved as shown in FIG. 12 is considerably reduced in FIG. 14.

From the above, the preferred embodiment provides numerous alternative sequences of mode shapes to accomplish varying acceleration areal coverage across lens cover 12. By way of example, the following Table 1 lists empirical numbers as an estimation of what may be achieved in one apparatus, where it is assumed that the maximum amplitude across all mode shapes is equal.

TABLE 1

| | Acceleration Coverage (% of area) | | |
|---|---|---|---|
| Threshold (% of peak) | (0.1) Mode | (0.1) and orthogonal (1.1) Modes | (0.1), orthogonal (1.1) modes, and (2.1) Modes |
| 25 | 46 | 77 | 84 |
| 50 | 27 | 67 | 77 |
| 75 | 12 | 60 | 72 |
| 90 | 5 | 56 | 69 |

Table 1 lists a percentage of the entire area of member MEM that experiences an acceleration that reaches or exceeds a percentage of peak acceleration. For example, looking at the first row of Table 1, it is understood that somewhere across lens cover 12 (i.e., member MEM) a peak acceleration occurs in response to the mode or modes applied to it by transducer 14, and if the preferred embodiment applies only the mode (0,1) shape as shown in the table second column (e.g., by a singular incident of step 26 in method 20), then 46% of the area of lens cover 12 is accelerated to at least 25% of that peak. However, as shown in the third column of the first row of Table 1, the areal coverage is increased considerably by adding two additional step 26 incidences, each to apply a respective one of the two orthogonal mode (0,1) shapes (see FIGS. 9 and 10); in this case, then more than a majority of the area, namely, 77% of the area of lens cover 12 is accelerated to at least 25% of that peak. Still further, as shown in the fourth column of the first row of Table 1, the areal coverage is increased still further by adding an additional step 26 incidence to apply the mode (2,1) shape in addition to the (0,1) and two orthogonal mode (0,1) shapes, where 84% of the area of lens cover 12 is accelerated to at least 25% of that peak. The remaining examples of Table 1 should be understood to one skilled in the art, and note that in each instance of the third and fourth columns, more than one-half of the area of the lens cover 12 reaches or exceeds the indicated peak threshold. Moreover, one skilled in the art also should appreciate that other combinations and numbers of mode shapes may be readily implemented per the preferred embodiments.

Figure 15:
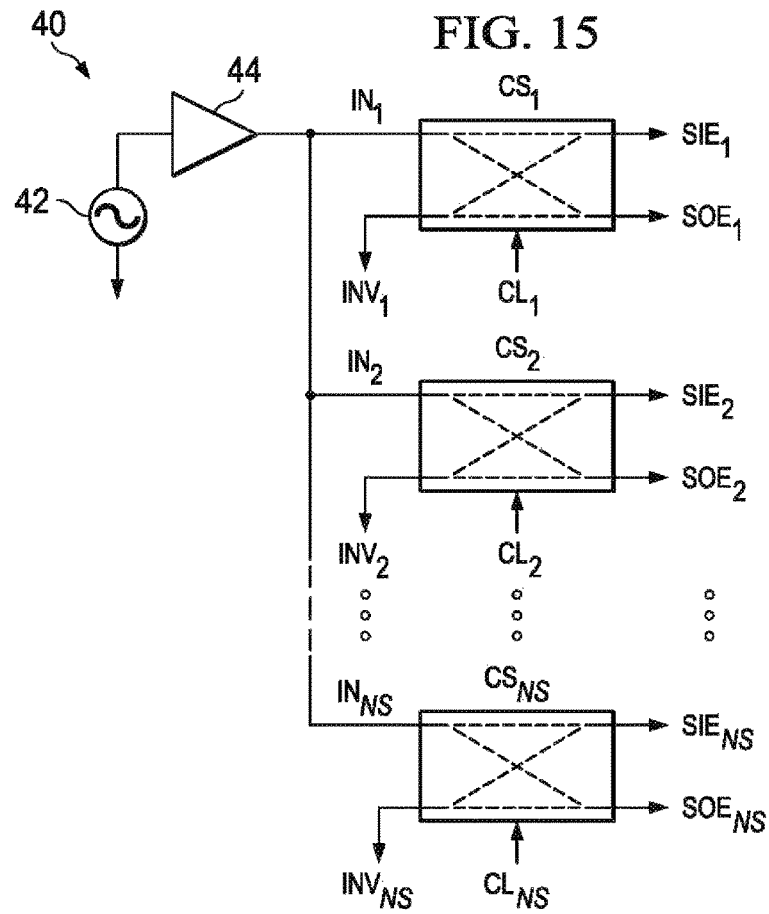
FIG. 15 illustrates an electrical block diagram of a driver architecture that may be used to drive the conductors of a segmented transducer according to a preferred embodiment.

FIG. 15 illustrates an electrical block diagram of a driver architecture 40 that may be used to drive the conductors of a segmented transducer 14 according to a preferred embodiment. Architecture 40 includes an oscillating wave (e.g., sine wave) source 42, connected between a reference (e.g., ground) and an input to a single amplifier 44. The output of amplifier 44 is connected to a number NS of crossbar switches $CS_1$ through $CS_{NS}$. Each crossbar switch $CS_x$ has an input $IN_x$ connected to the oscillating output of amplifier 44 and an inverted input $INV_x$ connected to ground. Moreover, each crossbar switch $CS_x$ has a first output $SIE_x$ for connecting to a respective inner electrode as illustrated above in connection with FIG. 6, and a second output $SOE_x$ for connecting to an outer respective electrode as illustrated above in connection with FIG. 6.

In operation, each crossbar switch $CS_x$ is operable, in response to a respective control signal $CL_x$, to either: (1) pass its oscillating signal input $IN_x$ to its $SIE_x$ output, while connecting ground from its inverted input $INV_x$ to its $SOE_x$ output; or (2) cross-couple the ground signal from its inverted input $INV_x$ to its $SIE_x$ output, while connecting its input $IN_x$ directly to its $SOE_x$ output; or (3) present a high impedance state where its inputs $IN_x$ and $INV_x$ are not passed to either output. For example, therefore, to excite the mode (2,1) shape with a four segment transducer, four crossbar switches would be required with the following Table 2 listing the appropriate control inputs to realize that mode shape:

TABLE 2

| Switch | Control Input |
|---|---|
| $CS_1$ | P |
| $CS_2$ | X |
| $CS_3$ | P |
| $CS_4$ | X |

In Table 2, a control input of "P" is intended to indicate a direct pass through, while a control input of "X" indicates the crossbar operation, whereby the inputs are switched. Thus, one skilled in the art will appreciate that Table 2 provides a same phase sine wave to opposing segments to segments $S_1$ and $S_3$, while ground is applied to segments $S_2$ and $S_4$, thereby transmitting standing waves so as to achieve the mode (2,1) shape. Other examples will be appreciated by one skilled in the art.

Figure 16:
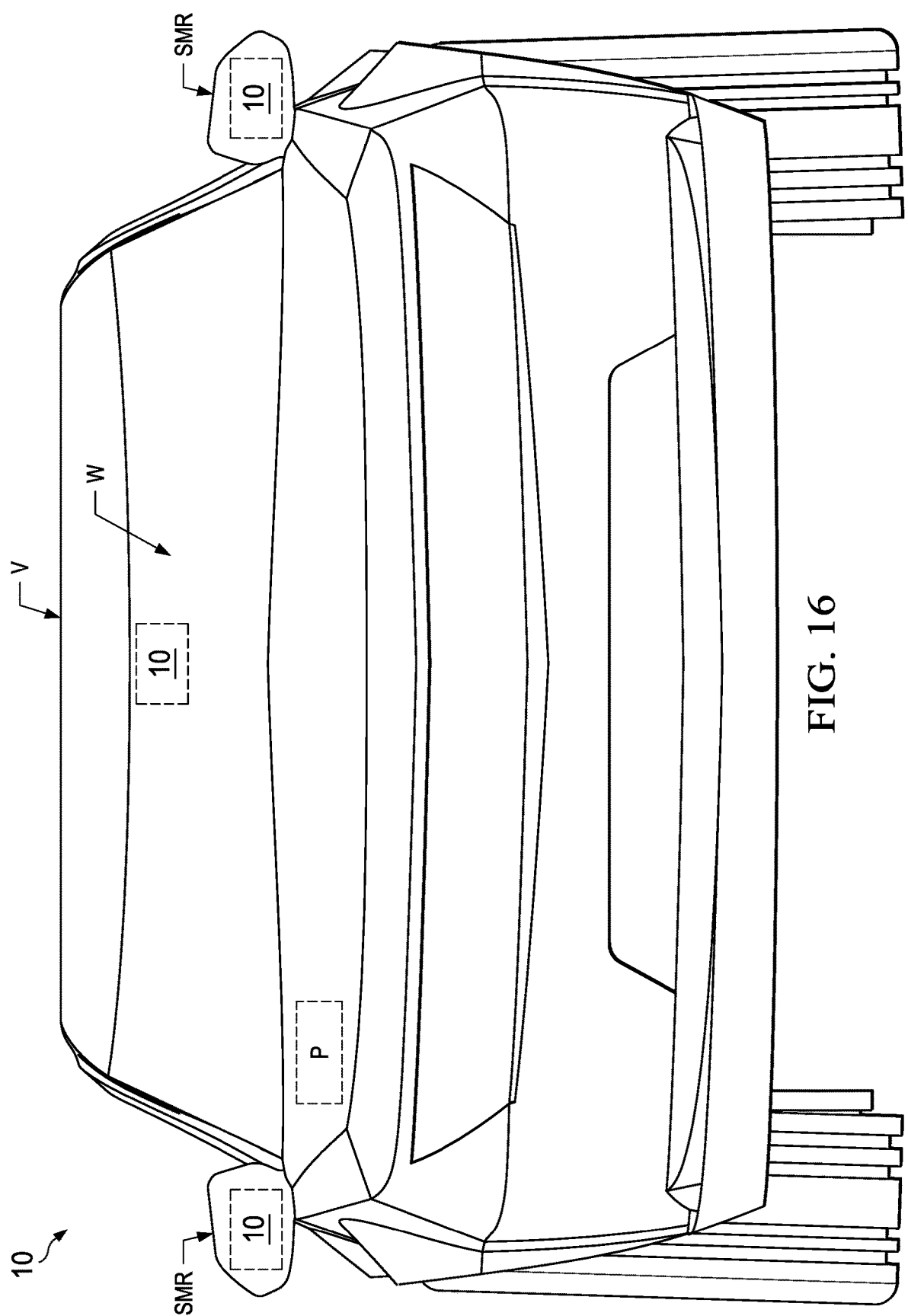
FIG. 16 illustrates a preferred embodiment vehicle V with multiple implementations of the system of FIG. 1.

FIG. 16 illustrates a preferred embodiment vehicle V with system 10 implemented in numerous locations relative to the vehicle V. For example, a forward facing camera may be installed as part of a system 10 in a mount located behind the windshield W of vehicle V. As another example, a respective rearward facing camera may be installed as part of a system 10 in each of the vehicle side mirror locations SMR, either in addition to or in lieu of an actual side mirror. As a final example, another rearward facing camera may be installed near or at the rear of the vehicle V, so as to assist with backup technology. Each system 10 communicates with a processor P, such as a controller, microcontroller, or the like, located either under the hood or inside the interior of the vehicle, where such communication as may be connected by some type of conductors, including a vehicle network system. In any event, each system 10 is operable to capture light signals as images, for various types of processing and/or display. Moreover, as described above, each such camera has a lens structure (e.g., lens, lens cover), and associated therewith is a transducer that is operable according to method 20 so as to reduce any contaminants on the surface of the lens structure.

From the above, the preferred embodiments are shown to provide an ultrasound lens structure cleaner and architecture method, either as a standalone unit or as part of a larger preferred embodiment system (e.g., a vehicle). Such preferred embodiments provide numerous benefits. For example, greater vibration coverage of the lens structure surface is achieved with high transverse amplitudes. As another example, greater acceleration coverage is achieved of the lens structure surface. As still another example, note that strains may be developed in multiple directions, rather than just the axial direction, to promote cracking of dried materials. More particularly, besides high transverse acceleration (orthogonal to the surface), lateral strain can be developed, which may be important for cracking dried contaminants Thus, strain may be imposed on the lens surface in both the radial and tangential directions. Thus, whereas due to the circular nature of the mode shape, strain is only applied in the radial but not in the tangential direction, the preferred embodiment may apply strain additionally in the tangential direction, whereby contaminants can be even more effectively removed. Specifically, asymmetric modes (e.g., mode (1,1) shape) will apply strain in both directions, leading to more effective cracking. As still another benefit, a straightforward driver circuit may drive system 10, requiring only a single amplifier. Still further, the preferred embodiments are implemented without vibration or resonance frequency matching issues. In view of the above, therefore, the inventive scope is far reaching, and while various alternatives have been provided according to the disclosed embodiments, still others are contemplated and yet others can ascertained by one skilled in the art. Given the preceding, therefore, one skilled in the art should further appreciate that while some embodiments have been described in detail, various substitutions, modifications or alterations can be made to the descriptions set forth above without departing from the inventive scope, as is defined by the following claims.

The invention claimed is:

1. A system, comprising:
a lens structure;
an oscillating wave source;
first, second, third and fourth conductors;
a ground terminal;
a transducer coupled to the lens structure, the transducer including first and second segments of a piezoelectric material, and the piezoelectric material configured to generate a strain responsive to an electrical signal, in which:
the first segment is electrically coupled to the first conductor and to the second conductor, the first conductor is configured to apply a first electrical signal to the first segment, and the second conductor is configured to apply a second electrical signal to the first segment; and the second segment is electrically coupled to the third conductor and to the fourth conductor, the third conductor is configured to apply a third electrical signal to the second segment, and the fourth conductor is configured to apply a fourth electrical signal to the second segment;

a first crossbar switch having a first control input, the first crossbar switch coupled: between the oscillating wave source and the first conductor; between the oscillating wave source and the second conductor; between the ground terminal and the first conductor; and between the ground terminal and the second conductor; and a second crossbar switch having a second control input, the second crossbar switch coupled: between the oscillating wave source and the third conductor; between the oscillating wave source and the fourth conductor; between the ground terminal and the third conductor; and between the ground terminal and the fourth conductor;

in which:

the first and second crossbar switches are configured to connect the oscillating wave source to both of the first and second segments at a same time, responsive to the first and second control inputs; or the first and second crossbar switches are configured to connect the oscillating wave source to different ones of the first and second segments at different times, responsive to the first and second control inputs.

2. The system of claim 1, wherein the first crossbar switch is configured, responsive to the first control input, to either: connect the oscillating wave source to the first conductor while connecting the ground terminal to the second conductor; or connect the oscillating wave source to the second conductor while connecting the ground terminal to the first conductor; or have a high impedance to disconnect the first conductor from the oscillating wave source and from the ground terminal and to disconnect the second conductor from the oscillating wave source and from the ground terminal.

3. The system of claim 2, further comprising fifth, sixth, seventh and eighth conductors, in which:

the transducer includes third and fourth segments of the piezoelectric material;

the third segment is electrically coupled to the fifth conductor and to the sixth conductor, the fifth conductor is configured to apply a fifth electrical signal to the third segment, and the sixth conductor is configured to apply a sixth electrical signal to the third segment;

the fourth segment is electrically coupled to the seventh conductor and to the eighth conductor, the seventh conductor is configured to apply a seventh electrical signal to the fourth segment, and the eighth conductor is configured to apply an eighth electrical signal to the fourth segment;

the system further comprises:

a third crossbar switch having a third control input, the third crossbar switch coupled: between the oscillating wave source and the fifth conductor; between the oscillating wave source and the sixth conductor; between the ground terminal and the fifth conductor; and between the ground terminal and the sixth conductor; and a fourth crossbar switch having a fourth control input, the fourth crossbar switch coupled: between the oscillating wave source and the seventh conductor; between the oscillating wave source and the eighth conductor; between the ground terminal and the seventh conductor; and between the ground terminal and the eighth conductor;

the lens structure has a center section, the first and second segments form a first pair of segments on first opposite sides of the center section, and the third and fourth segments form a second pair of segments on second opposite sides of the center section; and the crossbar switches are configured, responsive to their respective control inputs, to apply standing wave signals to the first and second pairs, including by:

for the first pair of segments, connecting the oscillating wave source to the first and third conductors while connecting the ground terminal to the second and fourth conductors; and for the second pair of segments, connecting the oscillating wave source to the sixth and eighth conductors while connecting the ground terminal to the fifth and seventh conductors.

4. The system of claim 1, wherein:

the first and second crossbar switches are configured to connect the oscillating wave source to both of the first and second segments at the same time.

5. The system of claim 3, wherein the first, second, third and fourth crossbar switches are configured to connect the oscillating wave source to:

a first subset of the segments at a first time; and a second subset of the segments at a second time.

6. The system of claim 1, wherein:

the first and second crossbar switches are configured to connect the oscillating wave source to different ones of the first and second segments at the different times.

7. The system of claim 6, wherein the first and second crossbar switches are configured to connect the oscillating wave source to achieve different oscillatory responses on the lens structure at the different times.

8. The system of claim 7, wherein the different oscillatory responses have different mode shapes.

9. The system of claim 8, wherein the different mode shapes include a mode (0,1) shape and a mode (1,1) shape.

10. The system of claim 8, wherein the different mode shapes include a mode (0,1) shape, a mode (1,1) shape, and a mode (2,1) shape.

11. The system of claim 1, wherein the lens structure includes a lens cover.

12. The system of claim 1, wherein the lens structure includes a camera lens.

13. The system of claim 1, wherein the lens structure includes a circular lens structure.

14. The system of claim 1, wherein the first and second segments are along an annulus of the transducer.

15. A camera assembly, comprising:

a camera;

a lens structure adjacent the camera;

an oscillating wave source;

first, second, third and fourth conductors;

a ground terminal;

a transducer coupled to the lens structure, the transducer including first and second segments of a piezoelectric material, and the piezoelectric material configured to generate a strain responsive to an electrical signal, in which:

the first segment is electrically coupled to the first conductor and to the second conductor, the first conductor is configured to apply a first electrical signal to the first segment, and the second conductor is configured to apply a second electrical signal to the first segment; and the second segment is electrically coupled to the third conductor and to the fourth conductor, the third conductor is configured to apply a third electrical signal to the second segment, and the fourth conductor is configured to apply a fourth electrical signal to the second segment;

a first crossbar switch having a first control input, the first crossbar switch coupled: between the oscillating wave source and the first conductor; between the oscillating wave source and the second conductor; between the ground terminal and the first conductor; and between the ground terminal and the second conductor; and a second crossbar switch having a second control input, the second crossbar switch coupled: between the oscillating wave source and the third conductor; between the oscillating wave source and the fourth conductor; between the ground terminal and the third conductor; and between the ground terminal and the fourth conductor;

in which:

the first and second crossbar switches are configured to connect the oscillating wave source to both of the first and second segments at a same time, responsive to the first and second control inputs; or the first and second crossbar switches are configured to connect the oscillating wave source to different ones of the first and second segments at different times, responsive to the first and second control inputs.

16. The assembly of claim 15, wherein the lens structure includes a lens cover or a camera lens.

17. The assembly of claim 15, wherein the first and second segments are along an annulus of the transducer.

18. A method of removing debris from a lens structure, the method comprising:

applying an oscillating wave source to first and second segments of a piezoelectric material of a transducer, the piezoelectric material configured to generate a strain responsive to an electrical signal, and the transducer coupled to the lens structure; and coupling waves from the transducer to the lens structure, responsive to the oscillating wave source;

in which the first segment is electrically coupled to a first conductor and to a second conductor, the first conductor is configured to apply a first electrical signal to the first segment, and the second conductor is configured to apply a second electrical signal to the first segment; and in which the second segment is electrically coupled to a third conductor and to a fourth conductor, the third conductor is configured to apply a third electrical signal to the second segment, and the fourth conductor is configured to apply a fourth electrical signal to the second segment; and in which applying the oscillating wave source includes:

applying the oscillating wave source to the first segment via a first crossbar switch, responsive to a first control signal input, to either: connect the oscillating wave source to the first conductor while connecting a ground to the second conductor; or connect the oscillating wave source to the second conductor while connecting the ground to the first conductor;

applying the oscillating wave source to the second segment via a second crossbar switch, responsive to a second control signal input, to either: connect the oscillating wave source to the third conductor while connecting a ground to the fourth conductor; or connect the oscillating wave source to the fourth conductor while connecting the ground to the third conductor; and applying the oscillating wave source to both of the first and second segments at a same time.

19. The method of claim 18, wherein applying the oscillating wave source includes:

applying the oscillating wave source to a first subset of the segments at a first time; and applying the oscillating wave source to a second subset of the segments at a second time.

20. The method of claim 18, wherein applying the oscillating wave source includes applying the oscillating wave source to different ones of the first and second segments at different times.

21. The method of claim 20, wherein applying the oscillating wave source includes applying the oscillating wave source to achieve different oscillatory responses on the lens structure at the different times.

22. The method of claim 21, wherein the different oscillatory responses have different mode shapes.

23. The method of claim 18, wherein the first and second segments are along an annulus of the transducer.

* * * * *